Dec. 10, 1963    E. MAIER    3,113,721
TEN TRANSFER DEVICE
Filed July 12, 1960    3 Sheets-Sheet 1
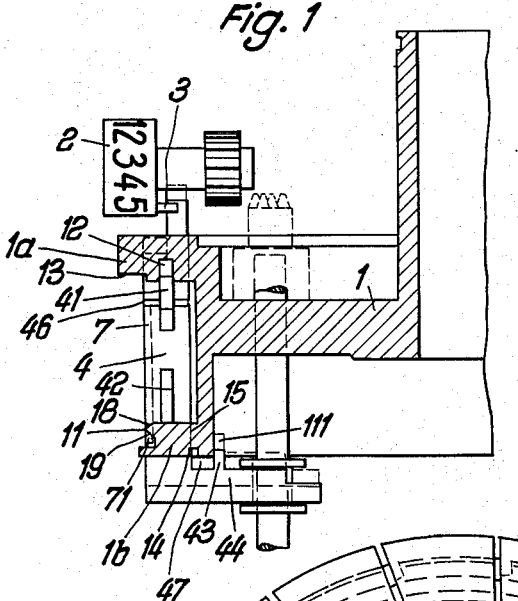
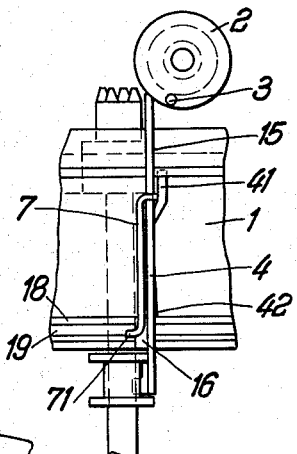
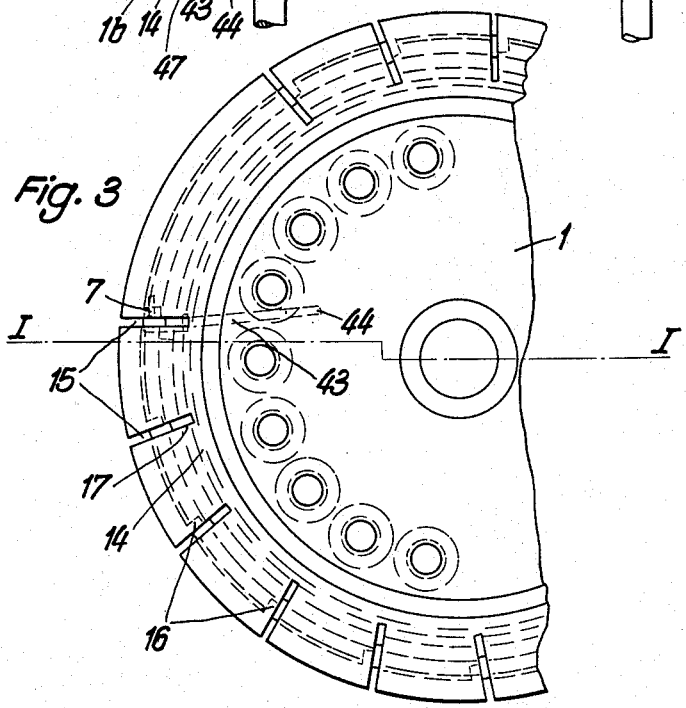
Inventor:
Elmar Maier

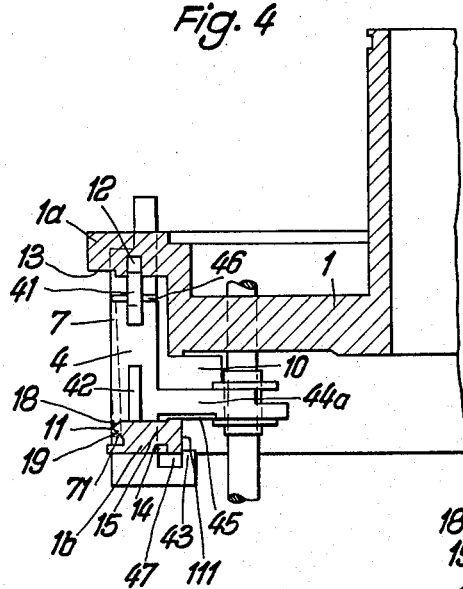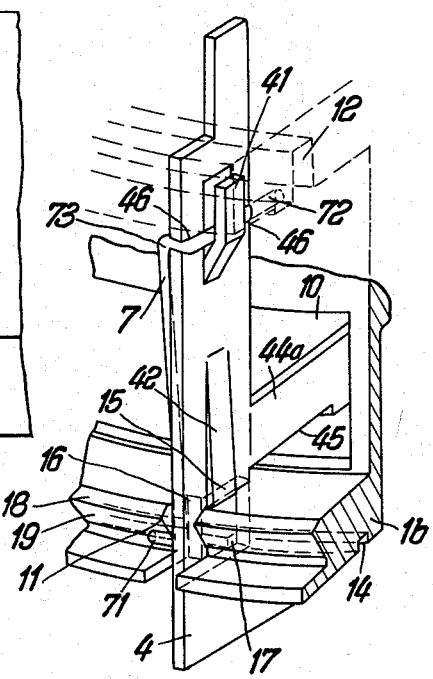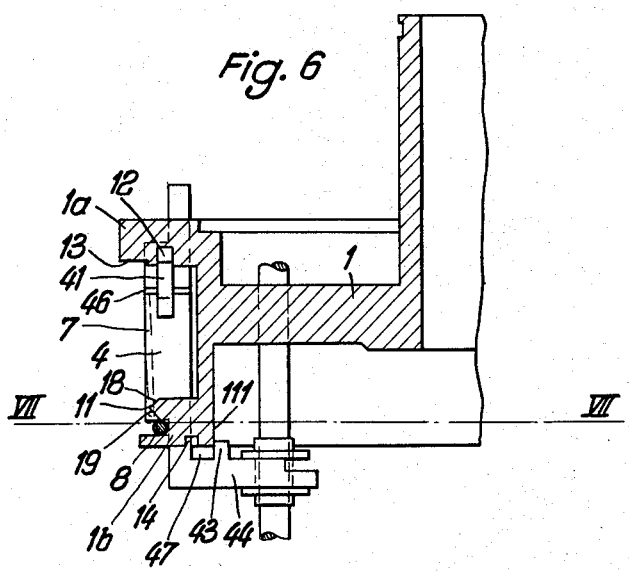

Dec. 10, 1963   E. MAIER   3,113,721
TEN TRANSFER DEVICE

Filed July 12, 1960   3 Sheets-Sheet 3

Inventor:

United States Patent Office 3,113,721
Patented Dec. 10, 1963

3,113,721
TEN TRANSFER DEVICE
Elmar Maier, 10 Lezte-Buhelweg, Feldkirch,
Vorarlberg, Austria
Filed July 12, 1960, Ser. No. 42,354
Claims priority, application Austria July 29, 1959
16 Claims. (Cl. 235—138)

The present invention relates to a ten transfer device for midget calculating machines of the circular type, comprising a drum-shaped machine body, setting members arranged in a circle around a barrel-shaped differential actuator, pinion members which transmit the value set up to digit rollers and removably arranged ten transfer members consisting of angle slides.

In the known ten transfer devices the anglelike ten transfer member, briefly called angle slide, is guided in a bearing which is formed as a sliding guide and together with the same is arranged in laterally open recesses (slots) of the machine body. Each bearing is secured by a screw to the machine body. In another construction the bearings are located by means of resilient tongues, which spring into the laterally open recesses of the machine body when the bearings are being inserted.

Special bearings as guides for the ten transfer members have the disadvantage that a relatively complicated expensive bearing, which is difficult to manufacture and which occurs several times in the circular calculating machine, is required, as well as the additional parts, such as screws, springs and the like, serving for its fixation, and that a considerable amount of assembling work is required. The drilling of the large number of tapped holes for the fixing screws for the bearings and the tightening of the screws are the reasons for a further increase in the cost of the circular calculating machine, which cost increase has an appreciable effect on the manufacturing costs. It must also be borne in mind that the arrangement of the bearing between the machine body and the ten transfer member results in a detrimental increase in tolerance.

It is also known to guide the ten transfer members longitudinally movably directly in the machine body. Proposals of this kind, however, have not yet led to a satisfactory result because the machine body must be provided with a plurality of bores, in which pins are received, which have forks serving to embrace sleeves which connect ten transfer double wheels, the teeth of which are staggered by one half tooth pitch.

As contrasted therewith a ten transfer device for midget calculating machines of the circular type, comprising a drum-shaped machine body, setting members arranged in a circle around a barrel-shaped differential actuator, pinion members which transfer the setting movement to digit rollers, and removably arranged ten transfer members consisting of angle slides and guided in the machine body, is characterized according to the invention in that the ten transfer members, which are guided in laterally open, slotlike recesses of the machine body, have slide lugs and slide noses which protrude laterally from the plane of the ten transfer members and during the longitudinal movement of the transfer members guide the same in an annular recess of the upper flange and on the inside of the lower flange of the machine body.

Together with the bearings, all disadvantages are eliminated which have previously resulted from the necessity of providing such bearings. The number of parts required is greatly decreased. The installation and removal of the ten transfer members can be performed more simply and quickly and the accuracy of the calculation machine is increased with a smaller structural expenditure and lower costs.

Further details and advantages will be explained with reference to illustrative embodiments shown in the drawing.

In the drawing:

FIG. 1 is a sectional view taken on line I—I of FIG. 3 and shows the machine body with the ten transfer functional parts for the result register of the calculating machine.

FIG. 2 is a fragmentary elevation associated with FIG. 1.

FIG. 3 is a top plan view associated with FIG. 1.

FIG. 4 shows a machine body with ten transfer functional parts for the revolutions register of the calculating machine.

FIG. 5 is a perspective view showing the ten transfer member for the revolutions register of the calculating machine and a part of the machine body.

FIG. 6 is a sectional view showing a second embodiment of the ten transfer device according to the invention.

Figure 7:
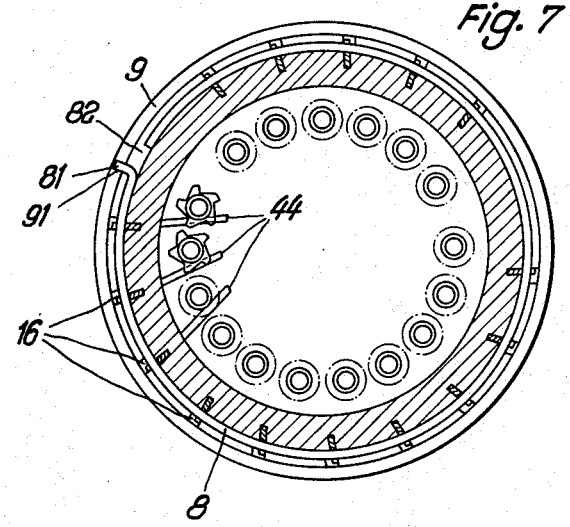
FIG. 7 is a sectional view taken on line VII—VII of FIG. 6.

The top flange 1a and the lower flange 1b of the machine body 1 are formed with exactly vertically aligned, laterally open recesses (slots) 15, which are slightly offset from but parallel to the center line of the calculating machine and in which the the ten transfer members 4 can longitudinally slide up and down. In the lower flange 1b the slots 15 have an enlargement 16, into which the ten transfer springs 7 extend (FIGS. 2, 3, 5). The top flange 1a of the machine member 1 is formed with an annular recess (groove) 12, in which a slide lug 41 protruding from the solid surface of the ten transfer member 4 can slide up and down and is guided. The lower flange 1b of the machine body has a sharp edge 11, which is formed by oblique surfaces 18, 19 extending approximately at right angles to each other and engaged by the laterally bent end 71 of the ten transfer spring 7 depending on whether the ten transfer member 4 is in its upper or lower position. On the underside of the lower flange 1b, an annular recess (groove) 14 is arranged, which communicates through a broken-out portion 17 (FIG. 5) with all slide slots 15 (FIGS. 1, 3, 4).

The ten transfer member 4 comprises in addition to the slide lugs 41 a spring lug or tongue 42 (FIG. 5), which springs out from the surface of the member. Rectangular recesses (notches) 46 are provided on both sides of the ten transfer member approximately on the level of the slide lug 41 and receive the ten transfer spring 7. A slide nose 43 at the angled lower end portion 44 of the ten transfer member 4 can slide up and down along the inner edge 111 of the machine body 1 during longitudinal movements of the ten transfer member in the course of the ten transfer and is guided in this manner. The ten transfer member shown in FIG. 4 for the revolutions register differs from the ten transfer member for the result register (FIG. 1) only in that an angled part 44a is disposed above the lower flange 1b and has a recess 45 at its lower end. The slide nose 43 is again at the same point as in the case of the ten transfer member for the result register.

Where transfer members according to the invention are used, the design and installation of the ten transfer members is much simpler than before. Initially the ten transfer spring 7 is secured to the ten transfer member 4. As is apparent from FIG. 5, the still straight top end 72 of the ten transfer spring 7 is first pushed behind the slide lug 41 and downwardly to such an extent that the laterally bent portion 73 of the spring can be inserted into the rectangular recesses 46 of the transfer member 4. Then the spring end 72 protruding on the other side of the slide is reversely bent to lie in the rectangular recess 46 of the other side of the transfer member. Thus, the ten transfer spring 7 is firmly connected to the ten transfer member 4, which is held by the slide lug 41 against displacement in a horizontal direction and by the rectangular recesses 46 against displacement in a vertical direction.

To instal the ten transfer member thus constructed into the machine body, the spring lug 42 is urged into the ten transfer member by means of pliers by a mere holding of the ten transfer member so that the spring lug no longer protrudes from the surface of the transfer member. The transfer member 4 can now be inserted into the exactly fitting slots, the upper end of the slide lug 41 and the upper end of the slide nose 43 sliding along the underside of the machine body flanges 1a and 1b, respectively, until the slide lugs 41 are introduced into the groove 12 and the slide nose 43 can engage the inside 111 of the machine body 1. This takes place at the same time. The ten transfer member 4 can then be moved upwardly by a small distance whereby the spring lug 42, which had previously been forced into the surface of the transfer member by the walls of the slot 15, is released and springs out. This spring lug forms a stop abutting the lower flange 1b of the machine body during a downward movement of the transfer member 4 in the course of the ten transfer and blocks the further downward movement of the transfer member. The stop is so dimensioned that the slide nose 43 and the slide lug 41 are just retained on the inside 111 of the machine body and in the groove 12, respectively. The ten transfer member is movable up and down over a distance which is limited by the engagement of the spring lug 42 with the lower flange and the engagement of the lower edge of the recess 47 of the angle slide 4 with the lower edge of the flange 1b, respectively. When installed, the reversely bent spring end 71 of the ten transfer spring 7 lies on one of the two oblique surfaces 18, 19 which form together the sharp edge 11 of the bottom flange 1b of the machine body. Engaging one of the oblique surfaces 18, 19, the pre-stressed ten transfer spring 7, the spring force of which is directed toward the axis of the machine body 1, produces an upwardly or downwardly directed component of force, depending on the position of the transfer member 4. When the reversely bent ten transfer spring end 71 springs over the edge 11 during the downward movement of the transfer member 4, a transfer point is provided, from which the ten transfer member springs to the stop at the lower flange without further external force action, only under the action of the ten transfer spring 7.

The ten transfer is effected as follows:

Before a ten transfer, the ten transfer member 4 is in its upper position, which is shown in dash lines in FIG. 1. When the digit roller 2 rotates from "9" to "0," the transfer pin 3 of the digit roller 2 strikes the upper end face of the ten transfer member 4 and urges the same downwardly. Together with the transfer member 4 the ten transfer spring 7 is also moved downwardly, whereby the reversely bent end 71, which in the initial position rested on the upper oblique surface 18 of the machine body 1 is forced over the edge 11. The latter forms the so-called transfer point. This means that an external force, which is transmitted in this case from the digit roller 2 through the intermediary of the transfer pin 3, must act on the ten transfer member 4 until the reversely bent spring end 71 reaches this point during its downward (or upward) movement. When the springs end 71 has reached this point, the ten transfer spring 7 will continue the downward movement by its own force as far as to a stop owing to the spring force tending to urge the spring end 71 in the direction of the axis of the machine body and thus producing on the lower oblique surface 19 of the machine body 1 a downwardly directed component of force. This continued movement of the ten transfer member 4 by its own force to a stop is necessary because, on the one hand, the circular movement of the transfer pin 3 will not provide for the entire linear displacement of the ten transfer member 4 and because the position assumed by the transfer member 4 must be maintained until the next action of an external force.

The assembly and installation of the ten transfer member 4, shown in FIG. 4, for the revolutions register is essentially the same, but its shape and consequently its installation differ somewhat from that of the ten transfer member 4, shown in FIG. 1, for the result register. In the transfer member 4 shown in FIG. 4 the angled part 44a is above the lower flange 1b of the machine body 1 and extends through a window 10 of the machine body (FIGS. 4, 5). It has a recess 45 at its lower edge.

The installation is effected as follows:

When the ten transfer spring 7 has been secured to the ten transfer member 4 as described hereinbefore, the transfer member is gripped with pliers in such a manner that the slightly protruding spring lug or tongue 42 is pressed into the corresponding slot or recess of the transfer member 4. The transfer member is now introduced into the slot 15 of the machine body 1 in the direction toward the axis thereof until the slide lug 41 engages the rim of the turned extension 13. The slide nose 43 is urged downwardly until it engages the circumferential guide surface on the inside rim of the turned annular recess 14, the transfer member sliding with the front portion of the angled part 44 on the lower edge of the window 10. The recessed part 45 of the angled portion 44 of the transfer member is sufficiently urged inwardly at this time to permit the transfer member to be pushed downwardly so that the slide nose 43 and the slide lug 41 are released for a continued movement in the direction of the axis of the machine body. The ten transfer member 4 can now be pushed into its end position in which the slide lug 41 can be introduced into the groove 12 and the slide nose 43 can engage the circumferential guide surface 111 of the machine body 1. In this position the transfer member 4 can be easily pushed upwardly in the axial direction. This permits the spring lug or tongue 42 to spring out of its position in the transfer member so that this lug serves as a stop for the downward movement of the transfer member. The guidance and limitation of the upward and downward movements of the ten transfer member shown in FIG. 4 are the same as shown in FIG. 1. A removal of the transfer member 4 is not possible until the spring lug 42 has been forced into the transfer member by means of pliers so that this is again pushed downwardly and can be unhooked from the groove 12 and the inside rim 111 of the machine body.

Figure 8:
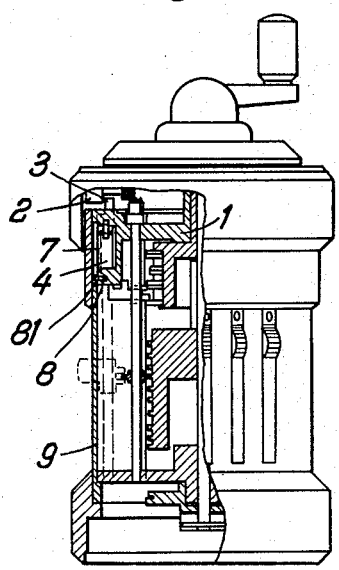
FIG. 8 is a general view of the circular calculating machine with the ten transfer arrangement.

FIGS. 6, 7, 8 show another embodiment of the ten transfer device according to the invention.

An annular spring 8 accommodated in a semi-circular groove in the lower flange 1b of the machine body 1 below the oblique surface 19 forms, on the one hand, the stop for the downward movement of all ten transfer members and during the ten transfer blocks a continued downward movement of the transfer members. On the other hand, it serves to retain the ten transfer members against a lateral sliding out of the slots 15 of the lower machine body flange. The ten transfer members are pushed into the slots 15 of the machine body 1 in a manner which is similar to that described hereinbefore. This is only possible, however, if the opening 82 (FIG. 7) of the annular spring 8 is in registry with the slot 15 in which the ten transfer member is to be inserted. The spring lug 42 is not required. When the ten transfer member 4 has been inserted into the slot 15, the spring ring is turned further in its groove until the next slot 15 is exposed by the spring opening 82 so that the next transfer member can be inserted. This is repeated until all ten transfer members have been inserted. Then the spring ring 8 is displaced in its longitudinal direction until the opening 82 reaches an unslotted portion of the machine body so that all slots 15 are blocked. In this position the reversely bent spring end 81 can engage a radial recess 91 of the housing 9 of the calculating machine to hold the annular spring 8 against rotation in the completely assembled calculating machine.

What is claimed is:

1. In calculating machines of the circular type, comprising a drum-shaped machine body having a peripheral face and provided in said peripheral face with inwardly directed slots extending parallel to the axis of said drum-shaped body, said drum-shaped body being also provided with recess means inwardly spaced from said slots; and a plurality of transfer members, each transfer member located in one of said slots and slidably guided therein for movement in axial direction of said body, and having projecting means adapted to engage during movement of the respective transfer member in axial direction a portion of said drum-shaped body bounding said recess means so as to prevent movement of the respective transfer member in their respective slot in outward direction.

2. In calculating machines of the circular type, a drum-shaped machine body comprising upper and lower flanges, said flanges having slotlike recesses, and ten transfer members in the form of slides directly engaging boundary surfaces of said slot-like recesses, and a transfer spring carried by each transfer member and forming a unit with the same, each transfer spring arresting the transfer member in two positions and moving with the same.

3. In calculating machines of the circular type, a drum-shaped machine body comprising upper and lower flanges, said flanges having slotlike recesses, said upper flange having an annular aperture, said lower flange having a rear guide face extending towards the center line of the machine, and ten transfer members having a slide lug laterally protruding from their plane, said slide lug engaging said annular recess of the upper flange, said ten transfer members comprising further a slide nose engaging said rear guide face of the lower flange from behind, said ten transfer members slidably engaging lateral surfaces of said recesses.

4. A ten transfer device as set forth in claim 2, said ten transfer spring consisting of a one-armed spring having one end fixed to said transfer member, and a free end cooperating with said machine body.

5. A ten transfer device as set forth in claim 4, said ten transfer members having on opposite sides recesses for mounting said spring, said spring having at said one end a loop fixed in said recesses of said transfer member.

6. A ten transfer device as set forth in claim 3, a ten transfer spring carried by each transfer member, said ten transfer members comprising recesses for mounting said spring, said slide lug of the ten transfer member being adapted to engage over one limb of said spring.

7. In a calculating machine of the circular type, in combination, a drum-shaped machine body comprising upper and lower flanges, said flanges having slot-like recesses, ten transfer members in the form of slides directly engaging boundary surfaces of said slot-like recesses, a ten transfer spring carried by each transfer member, said machine body comprising a peripherally extending annular acute edge adapted to cooperate with one end of said ten transfer spring to arrest the transfer members in two shifted positions to produce an automatically completed transfer movement to said shifted positions.

8. In a calculating machine of the circular type, in combination, a drum-shaped machine body comprising upper and lower flanges, said flanges having slot-like recesses, ten transfer members in the form of slides directly engaging boundary surfaces of said slot-like recesses, each ten transfer member having a slot which extends through the entire thickness of the material of said ten transfer member, and a tongue adapted to be resiliently pressed into said slot and normally projecting from the ten transfer member and engaging the lower flange of the machine body to limit the movement of the ten transfer member.

9. In a calculating machine of the circular type, in combination, a drum-shaped machine body comprising upper and lower flanges, said flanges having slot-like recesses, ten transfer members in the form of slides directly engaging boundary surfaces of said slot-like recesses, said upper flange having an annular aperture, said ten transfer members having a slide lug laterally protruding from their plane, said slide lug being adapted to engage said annular recess of the upper flange, said ten transfer members comprising further a slide nose, said slide nose being adapted to engage said rear guide face of the lower flange from behind, said ten transfer member having a slot which extends through the entire thickness of the material of said ten transfer member, and a tongue adapted to be resiliently pressed into said slot and normally projecting from the ten transfer member and engaging the lower flange of the machine body to limit the movement of the ten transfer member, the distance between the end faces of said slide lug and of said spring tongue being larger than the clear distance between said flanges of the machine body.

10. In a calculating machine of the circular type, in combination, a drum-shaped machine body comprising upper and lower flanges, said flanges having slot-like recesses, ten transfer members in the form of slides directly engaging boundary surfaces of said slot-like recesses, said machine body having an annular recess in the lower flange of the machine body, a spring having an interruption, the width of said interruption being larger than the width of a slotlike recess in said flange of the machine body, said spring being located in said annular recess substantially surrounding said lower flange for retaining said ten transfer members.

11. A ten transfer device as set forth in claim 10 including a housing enveloping said machine body, said housing having a recess, said annular spring having a radially bent end portion, said radially extending end portion being adapted to be received in said recess of said housing, said recess in the housing having such a position relative to said guide slots that the latter are covered by said annular spring.

12. In a calculating machine of the circular type, a barrel-shaped differential actuator body having longitudinal slots spaced about the periphery thereof; and a plurality of ten transfer slide units, each slide unit including a slide located in one of said slots slidably in the same in axial direction, and a spring secured to said slide at one end and having a free end resiliently engaging said actuator body for arresting the respective slide unit in two axially shifted positions.

13. In a calculating machine of the circular type, a barrel-shaped differential actuator body having longitudinal slots spaced about the periphery thereof and an annular projection; and a plurality of ten transfer slide units located in said slots slidably in the same, each slide unit including a flat slide member having a resilient projection engaging said actuator body to retain said slide unit in the same, and a ten transfer spring mounted on said slide member and cooperating with said annular projection so as to arrest said slide unit in two longitudinally shifted positions.

14. In a calculating machine of the circular type, a barrel-shaped differential actuator body having longitudinal slots spaced about the periphery thereof and an annular triangular projection having oblique sides; and a plurality of ten transfer slide units located in said slots slidably in the same, each slide unit including a flat slide member having a resilient projection engaging said actuator body to retain said slide unit in the same, and a ten transfer spring mounted on said slide member and cooperating with said annular projection so as to arrest said slide unit in two longitudinally shifted positions when engaging the sides of said triangular annular projection, respectively.

15. In a calculating machine of the circular type, a barrel-shaped differential actuator body having longitudinal slots spaced about the periphery thereof; and a plurality of ten transfer slide units located in said slots slidably in the same, said slide units having resilient means engaging said barrel-shaped actuator body to retain said slide units in said actuator movably between two positions, and a spring substantially surrounding said barrel-shaped actuator body and having an interruption adapted to be aligned with said slots during mounting of said slide units in said slots and being located between two of said slots so that said slide units are retained by said spring in said slots.

16. In a calculating machine of the circular type, a barrel-shaped differential actuator body having axially spaced flanges formed with aligned longitudinal slots spaced about the periphery thereof, and having recesses inwardly spaced from said slots; and a plurality of ten transfer slide units located in said slots slidably in the same, said slide units having resilient means engaging said barrel-shaped actuator body to retain said slide units in said actuator movably between two positions, and having angular projections for engaging said recesses in said two positions so that said slide units are retained in said slots.

References Cited in the file of this patent

UNITED STATES PATENTS 2,588,835   Herzstark _____ Mar. 11, 1952

FOREIGN PATENTS 478,595   Germany _____ July 4, 1929
656,601   Great Britain _____ Aug. 29, 1951